(12) United States Patent
Wu et al.

(10) Patent No.: US 12,282,179 B2
(45) Date of Patent: Apr. 22, 2025

(54) IMAGE COMPENSATION DEVICE AND PRISM CARRYING MECHANISM THEREOF

(71) Applicant: LUXSHARE-ICT CO., LTD., Taipei (TW)

(72) Inventors: Fu-Yuan Wu, Taipei (TW); Chun-Hui Wu, Taipei (TW); Shang-Yu Hsu, Taipei (TW); Meng-Ting Lin, Taipei (TW); Yu-Cheng Lin, Taipei (TW)

(73) Assignee: LUXSHARE-ICT CO., LTD, Taipei (TW)

( * ) Notice: Subject to any disclaimer, the term of this patent is extended or adjusted under 35 U.S.C. 154(b) by 626 days.

(21) Appl. No.: 17/581,257

(22) Filed: Jan. 21, 2022

(65) Prior Publication Data
US 2022/0342127 A1  Oct. 27, 2022

(30) Foreign Application Priority Data

Apr. 27, 2021  (CN) .......................... 202110459216.4

(51) Int. Cl.
*G02B 5/04*  (2006.01)
*G02B 7/18*  (2021.01)

(52) U.S. Cl.
CPC .............. *G02B 5/04* (2013.01); *G02B 7/1805* (2013.01)

(58) Field of Classification Search
CPC ................................ G02B 5/04; G02B 7/1805
USPC ......................................... 359/831, 837, 871
See application file for complete search history.

(56) References Cited

U.S. PATENT DOCUMENTS

| | | | | | |
|---|---|---|---|---|---|
| 2,655,832 | A | * | 10/1953 | Mihaly ................. | G03B 13/20 74/89.17 |
| 2,780,140 | A | * | 2/1957 | Luboshez ............. | G02B 13/10 353/69 |
| 3,450,464 | A | * | 6/1969 | Guffon .................. | G02B 13/10 359/831 |
| 4,061,415 | A | * | 12/1977 | Taenzer ................ | G01H 3/125 348/202 |
| 4,673,249 | A | * | 6/1987 | Schneider ........... | G02B 7/1805 359/837 |

(Continued)

FOREIGN PATENT DOCUMENTS

| | | |
|---|---|---|
| CN | 1288750 A | 10/2000 |
| CN | 1898803 A | 1/2007 |

(Continued)

*Primary Examiner* — Ricky D Shafer
(74) *Attorney, Agent, or Firm* — Birch, Stewart, Kolasch & Birch, LLP

(57) ABSTRACT

An image compensation device and a prism carrying mechanism thereof. The prism carrying mechanism comprises a base and a pair of prism carrying members. The base comprises a base body, a light passing hole disposed at the base body, and a plurality of first sliding assembling parts integrally formed on the same side of the base body. Each of the prism carrying members comprises a carrying member body, a prism assembling part disposed at the carrying member body and corresponding to the light passing hole, and a plurality of second sliding assembling parts integrally formed on the same side of the carrying member body. The prism assembling parts of the pair of prism carrying members are oppositely and alternately disposed in an axial direction. The plurality of second sliding assembling parts are slidably assembled to the plurality of first sliding assembling parts respectively.

18 Claims, 13 Drawing Sheets

(56) References Cited

U.S. PATENT DOCUMENTS

| | | | |
|---|---|---|---|
| 6,550,605 B1 | 4/2003 | Therrien et al. | |
| 7,974,009 B2 * | 7/2011 | Tsubaki | G02B 27/642 |
| | | | 359/557 |
| 8,827,463 B2 * | 9/2014 | Morikuni | G03B 21/14 |
| | | | 353/101 |
| 9,025,034 B2 * | 5/2015 | Haraguchi | H04N 23/686 |
| | | | 348/208.11 |
| 2012/0105923 A1 * | 5/2012 | Mikkelsen | G02B 26/0891 |
| | | | 358/475 |
| 2017/0160541 A1 * | 6/2017 | Carothers | G02B 17/08 |
| 2018/0267294 A1 | 9/2018 | Aschwanden et al. | |
| 2021/0263301 A1 * | 8/2021 | Oshima | G03B 21/147 |

FOREIGN PATENT DOCUMENTS

| | | |
|---|---|---|
| CN | 101000399 A | 7/2007 |
| CN | 101454715 A | 6/2009 |
| CN | 103348287 A | 10/2013 |
| CN | 107041156 A | 8/2017 |
| CN | 109586610 A | 4/2019 |
| CN | 210042053 U | 2/2020 |
| CN | 111866328 A | 10/2020 |
| JP | 9-145313 A | 6/1997 |
| JP | 2003-163824 A | 6/2003 |
| JP | 2008-70770 A | 3/2008 |
| TW | 201718847 A | 5/2017 |

\* cited by examiner

IMAGE COMPENSATION DEVICE AND PRISM CARRYING MECHANISM THEREOF

CROSS-REFERENCE TO RELATED APPLICATION

This application claims the priority benefit of Chinese Patent Application Serial Number 202110459216.4, filed on Apr. 27, 2021, the full disclosure of which is incorporated herein by reference.

BACKGROUND

Technical Field

The present disclosure relates to the technical field of image stabilization for camera devices, particularly to an image compensation device and a prism carrying mechanism thereof, where optical image stabilization of the image compensation device is achieved by image compensation by physically adjusting an optical axis.

Related Art

Camera devices are often equipped with image stabilization devices to compensate for handshake when holding and shooting with cameras for clear images. Conventional image compensation mechanism compensates the images in an optical way that physically adjusts the optical axis for image compensation, as disclosed in Chinese Patent CN 103348287A, two wedge-shaped prisms are respectively disposed on two prism supporting parts, which are then electromagnetically driven to rotate the wedge-shaped prisms around the optical axis corresponding to the direction of handshake on the fixed base part, so that the optical axis is offset to adjust the imaging position for performing image stabilization.

The prism supporting parts and the base part of the patent described above are respectively provided with guiding grooves. Spheroids are provided between the prism supporting parts and the base part. The guiding grooves of the prism supporting parts and the guiding groove of the base part are combined with the spheroids in a rolling manner so that the prism supporting parts could move relative to the base part with low friction. However, spheroids are prone to slide, to stuck in the guiding grooves, or to spin in this type of mechanism. As a result, the prism supporting parts could not be moved to predetermined positions according to the controlling commands, and the image compensation could not be accurately performed.

SUMMARY

The embodiments of the present disclosure provide an image compensation device and a prism carrying mechanism thereof tended to solve the problem of inaccurate image compensation caused by the inability of the prism supporting parts to move to predetermined positions due to the spheroids slipping or blocking between prism supporting parts and the base part.

The present disclosure provides a prism carrying mechanism, comprising a base and a pair of prism carrying members. The base comprises a base body, a light passing hole disposed at the base body, and a plurality of first sliding assembling parts integrally formed on the same side of the base body. Each of the prism carrying members comprises a carrying member body, a prism assembling part disposed at the carrying member body and corresponding to the light passing hole, and a plurality of second sliding assembling parts integrally formed on the same side of the carrying member body. The prism assembling parts of the pair of prism carrying members are oppositely and alternately disposed in an axial direction. The plurality of second sliding assembling parts are slidably assembled to the plurality of first sliding assembling parts respectively, allowing the pair of prism carrying members to respectively move around an axis passing through a center of the light passing hole.

The present disclosure also provides an image compensation device, comprising a prism carrying mechanism according to the above aspect, a pair of driving modules, and a pair of wedge-shaped prisms. Each of the driving modules comprises a driving member disposed at the base and a driven member disposed at each of the prism carrying members. The driving member drives the driven member to move the prism carrying member around the axis. The pair of wedge-shaped prisms are respectively disposed at the prism assembling parts of the pair of prism carrying members. A thick end of one wedge-shaped prism corresponds to a thin end of the other wedge-shaped prism.

In the embodiments of the present disclosure, by disposing the first sliding assembling parts at the base and the second sliding assembling parts at the prism carrying member, where the first sliding assembling parts are slidably assembled to the second sliding assembling parts, the prism carrying member can be driven by the driving module to move along the base. Since the first sliding assembling parts are disposed at the base and the second sliding assembling parts are disposed at the carrying member body of the prism carrying member, when the prism carrying member moves along the base, the first sliding assembling parts and the base would move synchronously, and the second sliding assembling parts and the prism carrying member would also move synchronously so that there would be no slippage or blockage between the second sliding assembling parts and the first sliding assembling parts. Thus, the prism carrying member could accurately move to a predetermined position along the base according to control commands for accurate image compensation.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
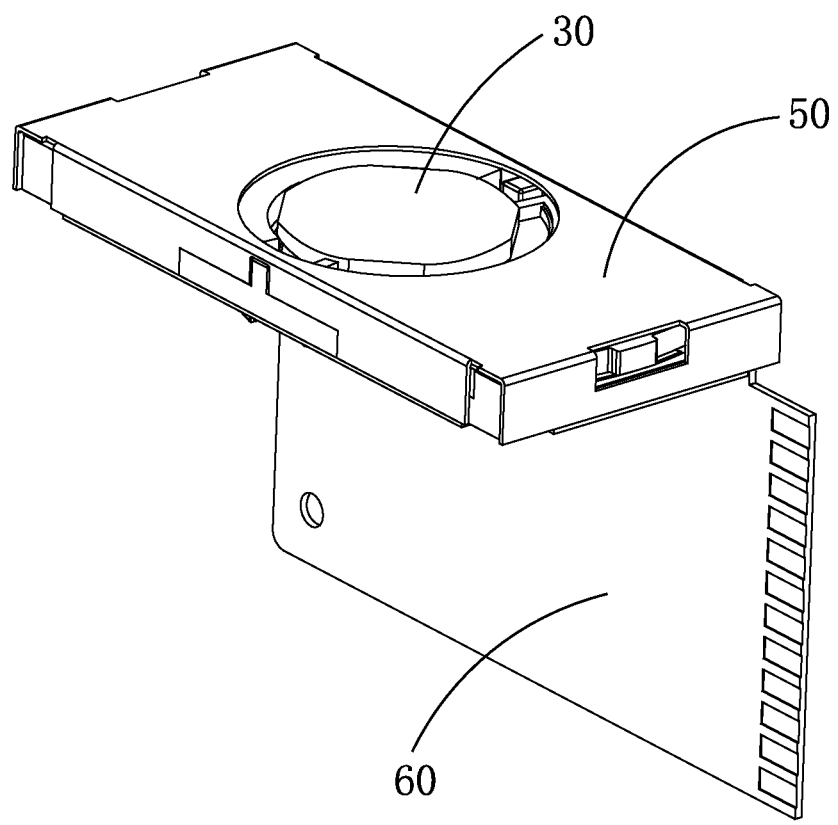
FIG. 1 is a perspective view of an image compensation device of an embodiment of the present disclosure.
Figure 2:
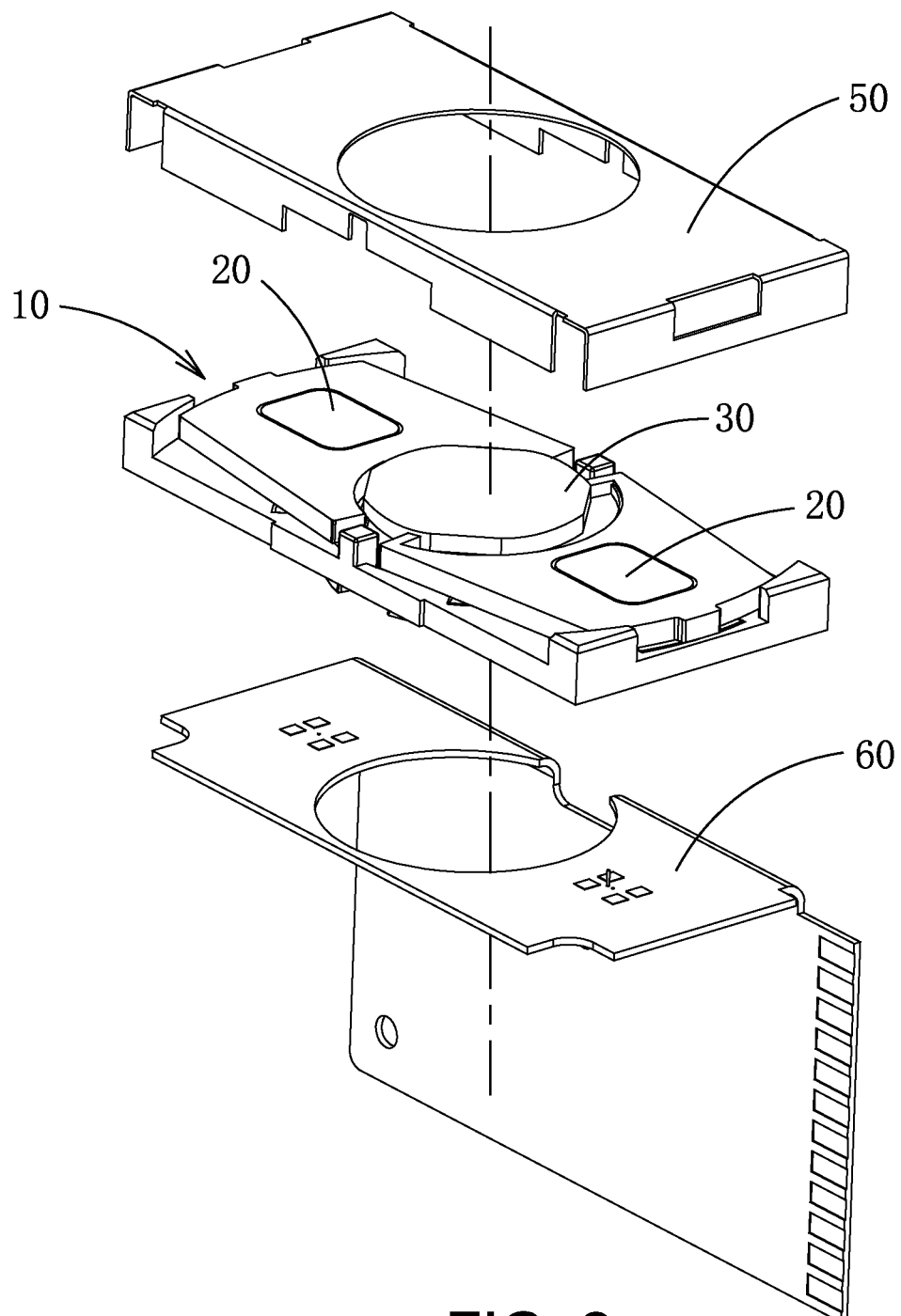
FIG. 2 is a partially exploded view of the image compensation device of FIG. 1.
Figure 3:
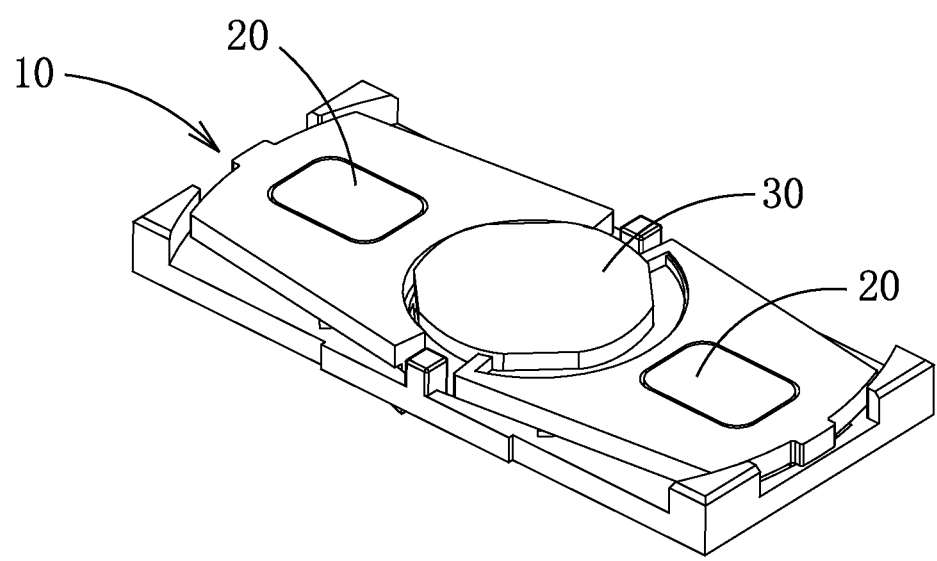
FIG. 3 is a perspective view of a prism carrying mechanism of the first embodiment of the present disclosure.
Figure 4:
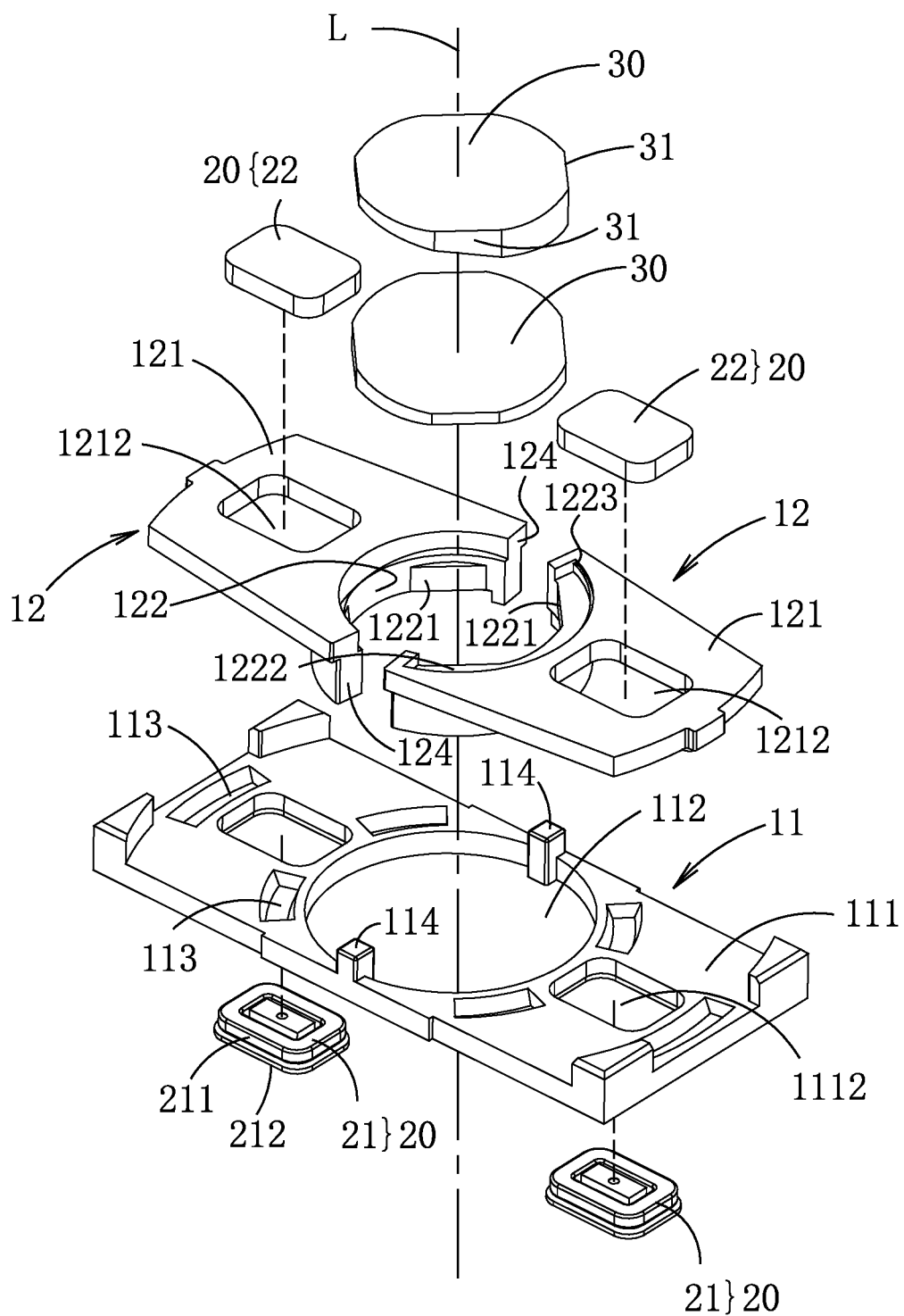
FIG. 4 is an exploded view of the prism carrying mechanism of FIG. 3.
Figure 5:
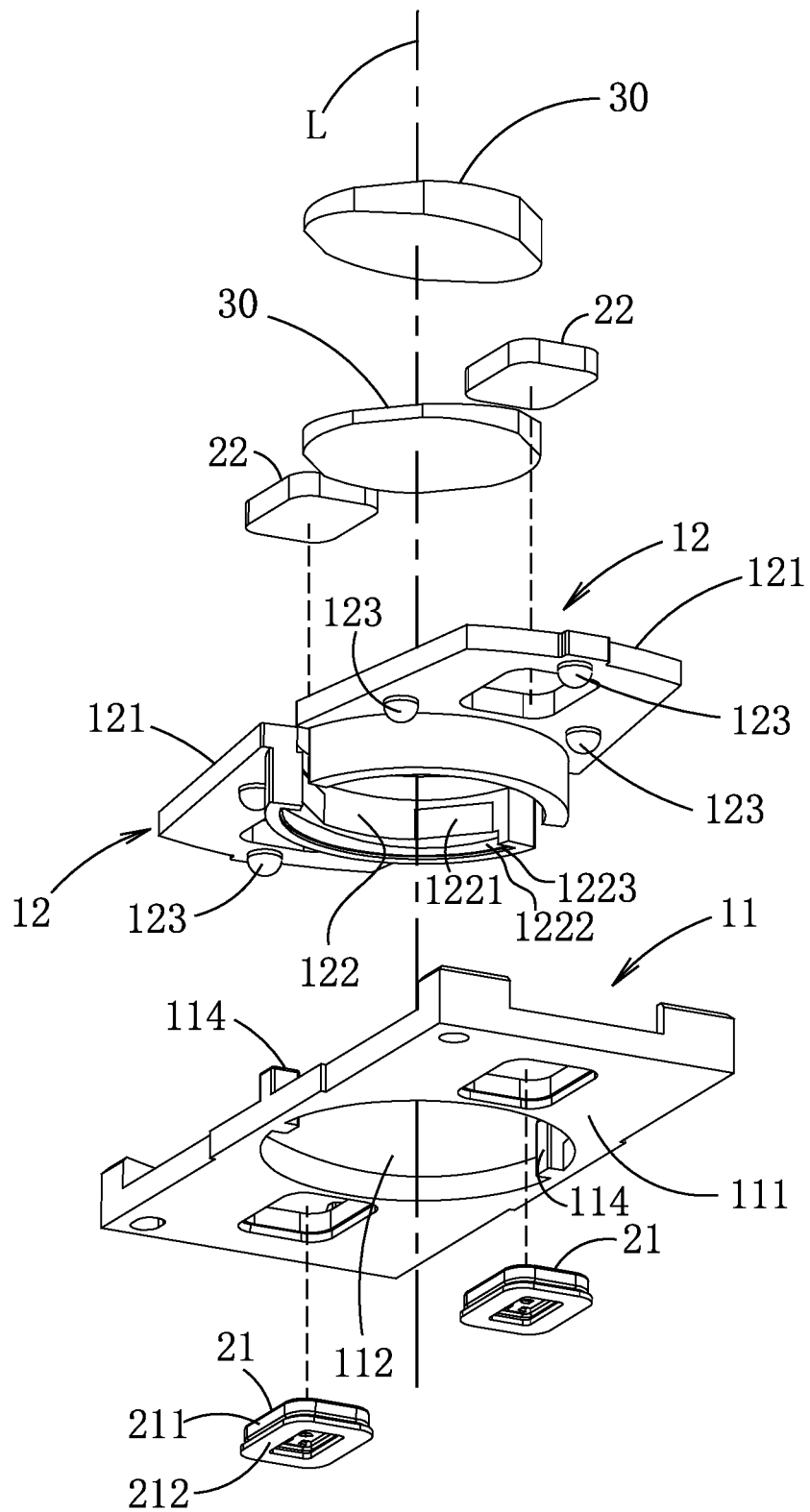
FIG. 5 is an exploded view of the prism carrying mechanism of FIG. 4 from another perspective.

FIG. 1 is a perspective view of an image compensation device of an embodiment of the present disclosure. FIG. 2 is a partially exploded view of the image compensation device of FIG. 1. FIG. 3 is a perspective view of a prism carrying mechanism of the first embodiment of the present disclosure. FIG. 4 is an exploded view of the prism carrying mechanism of FIG. 3. FIG. 5 is an exploded view of the prism carrying mechanism of FIG. 4 from another perspective. As shown in the figures, an image compensation device 1 of this embodiment comprises a prism carrying mechanism 10, a pair of driving modules 20, and a pair of wedge-shaped prisms 30. The image compensation device 1 further comprises a housing 50 covering the prism carrying mechanism 10 and a circuit board 60 disposed under the prism carrying mechanism 10. The wedge-shaped prisms 30 are carried on the prism carrying mechanism 10. The driving modules 20 are electrically connected to the circuit board 60 which is equipped with a controller to control the driving modules 20 to drive the prism carrying mechanism 10 to move, so that the wedge-shaped prisms 30 could move around an optical axis of the image compensation device 1. In this way, the optical axis could be offset to adjust the imaging position for image stabilization.

As shown in FIG. 4 and FIG. 5, in this embodiment, the prism carrying mechanism 10 comprises a base 11 and a pair of prism carrying members 12. The base 11 comprises a base body 111 and a light passing hole 112 disposed at the base body 111, and a plurality of first sliding assembling parts 113 disposed on the same side of the base body 111. The plurality of first sliding assembling parts 113 are integrally formed with the base body 111. With the light passing hole 112 as the center, the base body 111 is considered to be divided into a left part and a right part, respectively correspond to the pair of prism carrying members 12. The plurality of first sliding assembling parts 113 are disposed on an upper surface of the base body 111. Besides, the base body 111 is further provided with an assembling hole 1112 for the installation for a driving member 21 of the driving module 20.

As shown in FIG. 4 and FIG. 5, the pair of prism carrying members 12 are coplanar, but it is not limited thereto. Each of the prism carrying members 12 comprises a carrying member body 121, a prism assembling part 122 disposed at the carrying member body 121 and corresponding to the light passing hole 112, and a plurality of second sliding assembling parts 123 disposed on the same side with the carrying member body 121. The plurality of second sliding assembling parts 123 are integrally formed on the carrying member body 121. The prism assembling parts 122 of the pair of prism carrying members 12 are oppositely and alternately disposed in an axial direction. In this embodiment, the prism assembling part 122 is an arc-shaped recess provided on an edge of the carrying member body 121 to fit with an edge of the wedge-shaped prism 30. The carrying member body 121 is further provided with an assembling hole 1212 for the installation for a driven member 22 of the driving module 20. In this embodiment, an outer periphery of the wedge-shaped prism 30 comprises a plurality of linear edges 31. Each of the prism assembling parts 122 comprises a linear assembling edge 1221 corresponding to the linear edge 31 of the wedge-shaped prism 30, allowing the wedge-shaped prism 30 to be easily positioned on the prism assembling part 122. The recess is also provided with a glue dispensing groove 1222 and a glue overflow groove 1223 arranged axially adjacent to an upper side and a lower side of the prism assembling part 122 respectively, which facilitates the wedge-shaped prism 30 to be adhered and secured to the prism assembling part 122 with glue.

As shown in FIG. 3, FIG. 4, and FIG. 5, each of the driving modules 20 comprises the aforementioned driving member 21 disposed at the base 11 and the aforementioned driven member 22 disposed at each of the prism carrying member 12. The driving member 21 drives the driven member 22 to move the prism carrying member 12 around an axis L along the base 11. In this embodiment, the driving member 21 comprises a coil 211 and a magnetic conductive sheet 212 disposed at one side of the coil 211. In this embodiment, the driven member 22 comprises a permanent magnet. For example, the coil 211 is disposed between the magnetic conductive sheet 212 and the permanent magnet of the driven member 22. When the coil 211 is electrically energized, magnetic fields in various magnetic directions would be generated according to electric current directions and would interact with the permanent magnet of the driven member 22, so that the driven member 22 can be pushed in different directions according to the magnetic fields generated by the coil 211. The magnetic conductive sheet 212 and the permanent magnet of the driven member 22 would keep mutually attracted. Regardless the coil 211 is electrically energized or not, the magnetic attraction between the magnetic conductive sheet 212 and the driven member 22 would keep the base 11 and the prism carrying member 12 to be mutually attracted at any time. Wherever the light axis faces, however the image compensation device 1 is placed, and whether the prism carrying member 12 rotates about the axis L relative to the base 11 or not, the magnetic conductive sheet 212 and the permanent magnet of the driven member 22 would keep the relative distance between the base 11 and the prism carrying member 12 on the axis L unchanged (for example, the base 11 and the prism carrying member 12 are in continuous contact without being separated, through the first sliding assembling part 113 and the second sliding assembling part 123) to keep the overall operation stable. During the operation, the coil 211 would generate adequate magnetic field to overcome the attractive force between the magnetic conductive sheet 212 and the permanent magnet of the driven member 22, thereby pushing the driven member 22 to move.

As shown in FIG. 4 and FIG. 5, the prism assembling part 122 of the prism carrying member 12 on the left is on a lower half of the recess, so that the wedge-shaped prism 30 is assembled on the lower half of the prism carrying member 12 on the left. Similarly, the prism assembling part 122 of the prism carrying member 12 on the right is on an upper half of the recess, so that the wedge-shaped prism 30 is assembled on the upper half of the prism carrying member 12 on the right. As mentioned above, the prism carrying members 12 are coplanar, hence the prism carrying member 12 on the right could move the wedge-shaped prism 30 on above, and the prism carrying member 12 on the left could move the wedge-shaped prism 30 in below. The "left" and "right" herein refer to the directions shown in FIG. 4 and FIG. 5, the one close to the reader is the right, and the one far away from the reader is the left. However, in another embodiment, the prism carrying member 12 on the right may move the wedge-shaped prism 30 in below, and the prism carrying member 12 on the left may move the wedged-shaped prism 30 on above. Between the wedge-shaped prisms 30 arranged in an up and down manner, a thick end of one wedge-shaped prism 30 corresponds to a thin end of the other wedge-shaped prism 30.

As shown in FIG. 5, the plurality of second sliding assembling parts 123 are disposed on a lower surface of the carrying member body 121 of each of the prism carrying members 12 and are slidably assembled to the plurality of first sliding assembling parts 113, respectively. In this way, the pair of prism carriers carrying members 12 could individually move around the axis L passing through the center of the light passing hole 112. The axis L could be an axis along which the optical axis of a lens group of a camera device extends. Thus, since the first sliding assembling parts 113 are integrated with the base 11 in one piece and the second sliding assembling parts 123 are integrated with the prism carrying member 12 in one piece, when the prism carrying member 12 moves along the base 11, the first sliding assembling parts 113 and the base 11 would move synchronously, and the second sliding assembling parts 123 and the prism carrying member 12 would also move synchronously, so there will be no slippage or blockage between the second sliding assembling parts 123 and the first sliding assembling parts 113. Thus, the prism carrying member 12 could be accurately moved to a predetermined position along the base 11 according to the control command for accurate image compensation.

The two prism carrying members 12 on the left and right could be individually controlled to move along the base 11. The prism carrying member 12 on the left is used to rotate and move the wedge-shaped prism 30 in below, and the prism carrier 12 on the right is used to rotate and move the wedge-shaped prism 30 on above. Nine movement scenarios for the prism carrying members 12 could be: (1) the left one rotates clockwise while the right one stills, (2) the left one rotates counterclockwise while the right one stills, (3) both still, (4) the left one rotates clockwise while the right one also rotates clockwise, (5) the left one rotates counterclockwise while the right one rotates clockwise, (6) the left one stills while the right one rotates clockwise, (7) the left one rotates clockwise while the right one rotates counterclockwise, (8) both rotate counterclockwise, and (9) the left one stills while the right one rotates counterclockwise, which correspond to various scenarios for image compensation of stabilization.

In this embodiment, the first sliding assembling part 113 is an arc-shaped guiding groove, a center of a circle corresponding to each of the arc-shaped guiding grooves coincides with the center of the light passing hole 112, and each of the second sliding assembling parts 123 is a bump. Furthermore, in this embodiment, the arc-shaped guiding groove comprises two opposite sidewalls and a bottom wall. An inclination angle greater than 90 degrees is formed between the two opposite sidewalls and the bottom wall, thus a cross sectional area of the arc-shaped guiding groove of this embodiment is an inverted trapezoid area. In this embodiment, the bump is hemispherical. The bump is slidably assembled with the arc-shaped guiding groove having an inverted trapezoid cross sectional area to effectively reduce the size of contact area and the friction in between, thus with the same pushing force, the rotatable angle could be increased to improve the flexibility of the prism carrying member 12 to move along the base 11. In this way, the optical image stabilization could be improved.

As shown in FIG. 4 and FIG. 5, the number of the first sliding assembling parts 113 is at least three, and the corresponding second sliding assembling parts 123 is also at least three. The distance between at least one of the first sliding assembling parts 113 and the center of the light passing hole 112 is different from the distances between the other first sliding assembling parts 113 and the center of the light passing hole 112. Each of the prism carrying members 12 comprises three second sliding assembling parts 123 to be slidably assembled with the first sliding assembling parts 113, which could keep the prism carrying member 12 to be level with the base 11, and the costs to be reduced. Besides, in this embodiment, the distance between one of the arc-shaped guiding grooves of the three first sliding assembling parts 113 and the center of the light passing hole 112 is farther than those between the other two and the center of the light passing hole 112, while the other two are close to an edge of the light passing hole 112 and the distances between them and the center of the light passing hole 112 are the same. The total length of the two arc-shaped guiding grooves close to the light passing hole 112 is greater than the length of the arc-shaped guiding groove farther from the light passing hole 112. That is because the corresponding hemispherical bump of the second sliding assembling part 123 applies a lower moment to the farther arc-shaped guiding groove due to a longer arm of force, so that the impact force of the hemispherical bump of the second sliding assembling part 123 on the arc-shaped guiding groove would be low. In this way, when the prism carrying member 12 rotates to the maximum angle relative to the base 11, the farther hemispherical bump of the second sliding assembling part 123 from the light passing hole 112 would firstly contact with an end of the arc-shaped guiding groove of the corresponding first sliding assembling part 113 and be stopped, which could effectively reduce the collision loss and stabilize the characteristics for the whole device.

As shown in FIG. 4, the base 11 further comprises a pair of stopping members 114 disposed on the base body 111. The pair of stopping members 114 are disposed on opposite sides of the light passing hole 112. The pair of prism carrying members 12 are respectively disposed at two sides of a connecting line of the pair of stopping members 114. Two end edges 124 of the carrying member body 121 adjacent to the prism assembling part 122 could respectively abut against the pair of stopping members 114. In this embodiment, the pair of stopping members 114 are respectively disposed on an edge of the light passing hole 112 and are separated by an angular distance of 180 degrees. Each of the stopping members 114 is quadrangular column shaped and protrudes from the edge of the light passing hole 112. The stopping member 114 could prevent one of the two prism carrying members 12 from colliding with the other one due to over rotation of the prism carrying member 12. The stopping members 114 and the base body 111 are also integrally formed to one piece.

Figure 6:
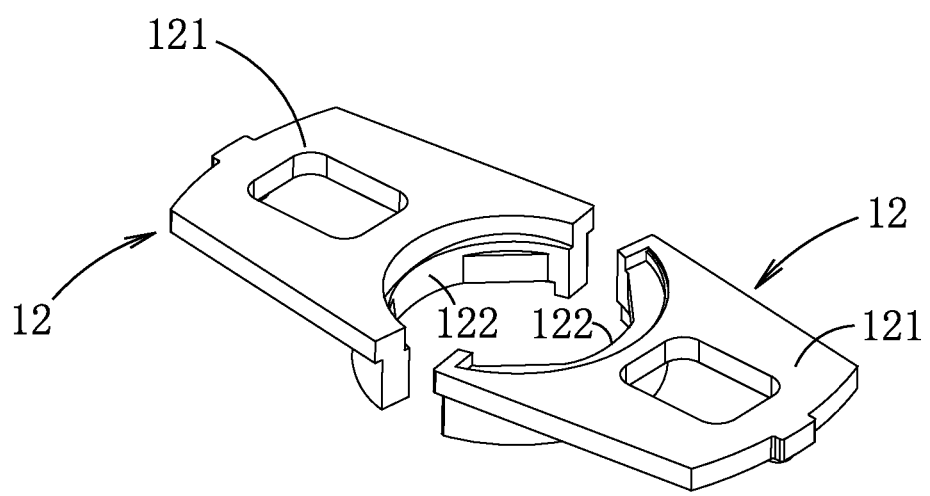
FIG. 6 is an exploded view of a prism carrying mechanism of the second embodiment of the present disclosure.
Figure 6:
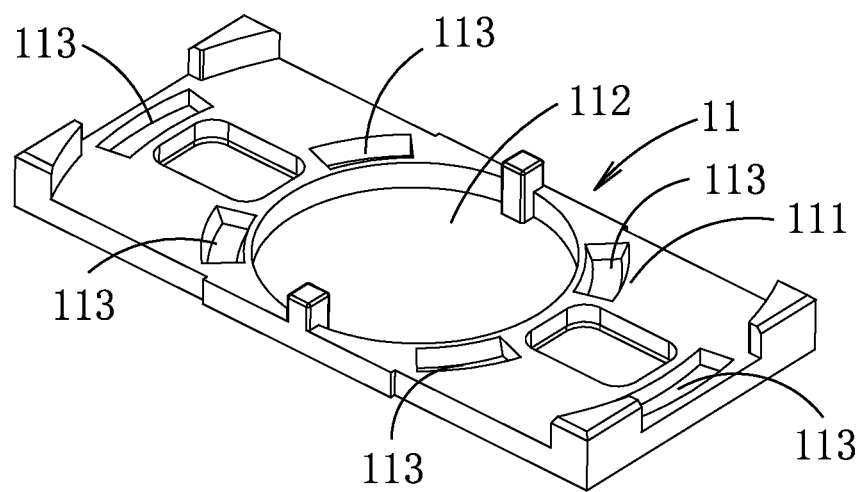
Figure 7:
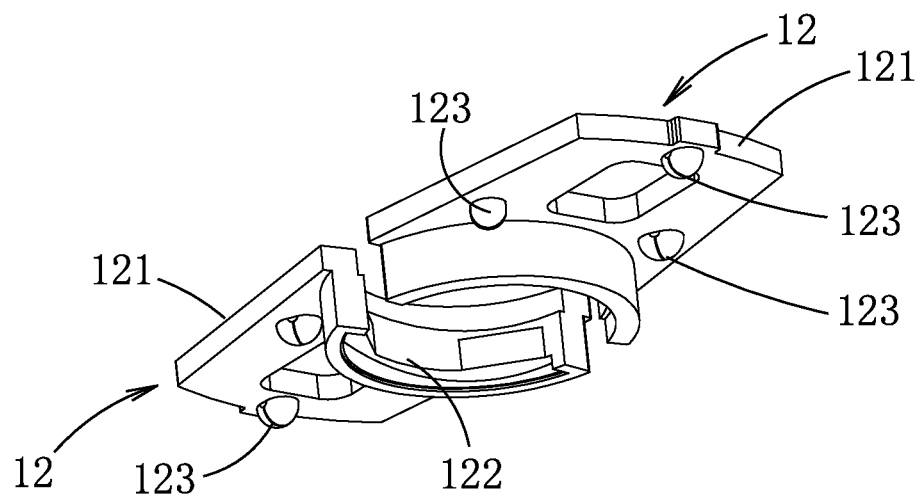
FIG. 7 is an exploded view of the prism carrying mechanism of FIG. 6 from another perspective.
Figure 7:
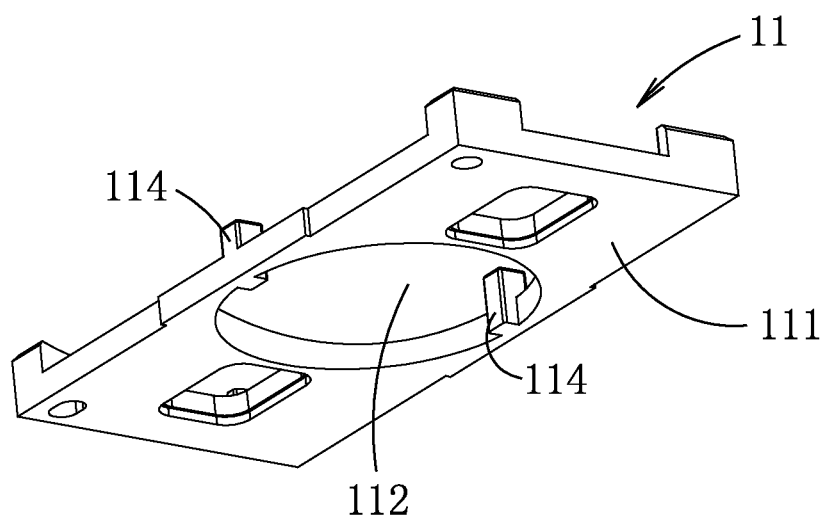

FIG. 6 is an exploded view of a prism carrying mechanism of the second embodiment of the present disclosure. FIG. 7 is an exploded view of the prism carrying mechanism of FIG. 6 from another perspective. Since the structural configuration of this embodiment is partially identical to that of the first embodiment, the same components would be given the same reference signs and relevant descriptions would be omitted. As shown in the figures, a first sliding assembling part 113 of this embodiment is structurally identical to the first sliding assembling part 113 of the first embodiment. A second sliding assembling part 123 of this embodiment is hemicapsule shaped. The hemicapsule shape herein refers to a structural configuration in which two ends of the second sliding assembling part 123 are hemispherical, and an intermediate part connecting the two hemispheres is the other part having a spherical or cylindrical structural configuration. In this embodiment, the two quarter-spherical ends of the hemicapsule shaped second sliding assembling part 123 abut against two sidewalls of the first sliding assembling part 113.

Figure 8:
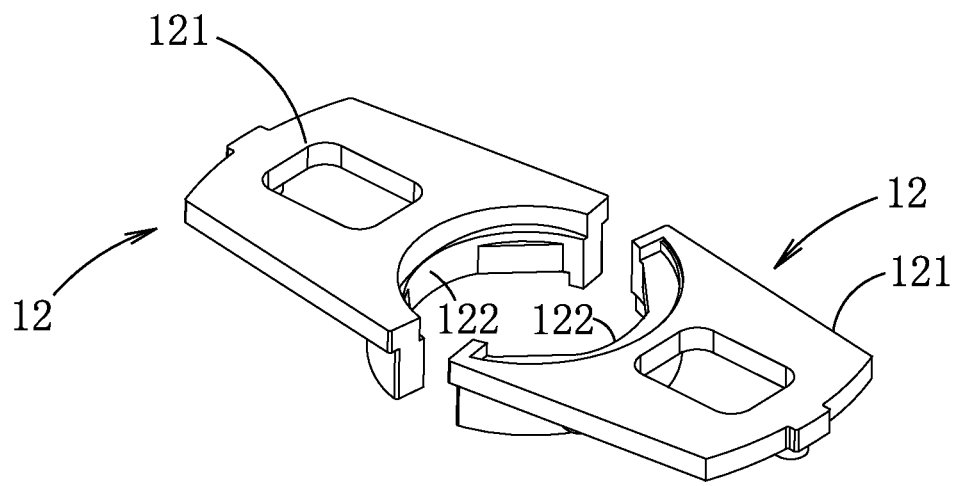
FIG. 8 is an exploded view of a prism carrying mechanism of the third embodiment of the present disclosure.
Figure 8:
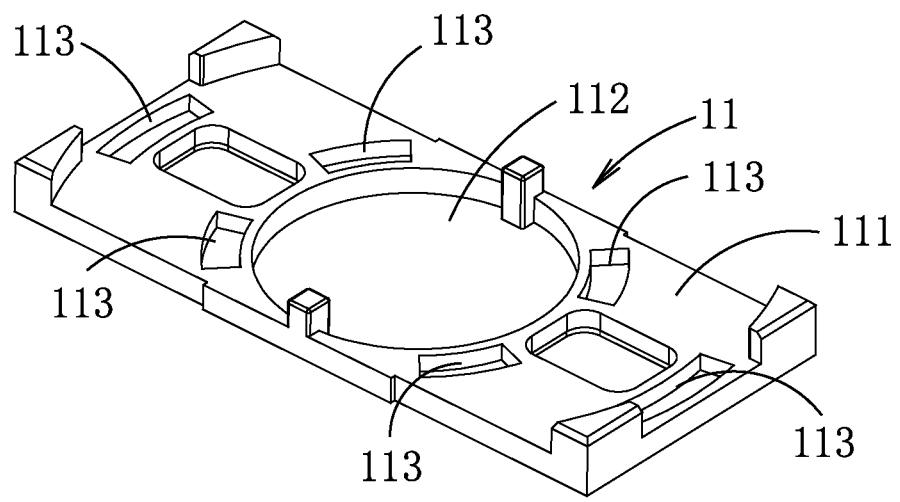
Figure 9:
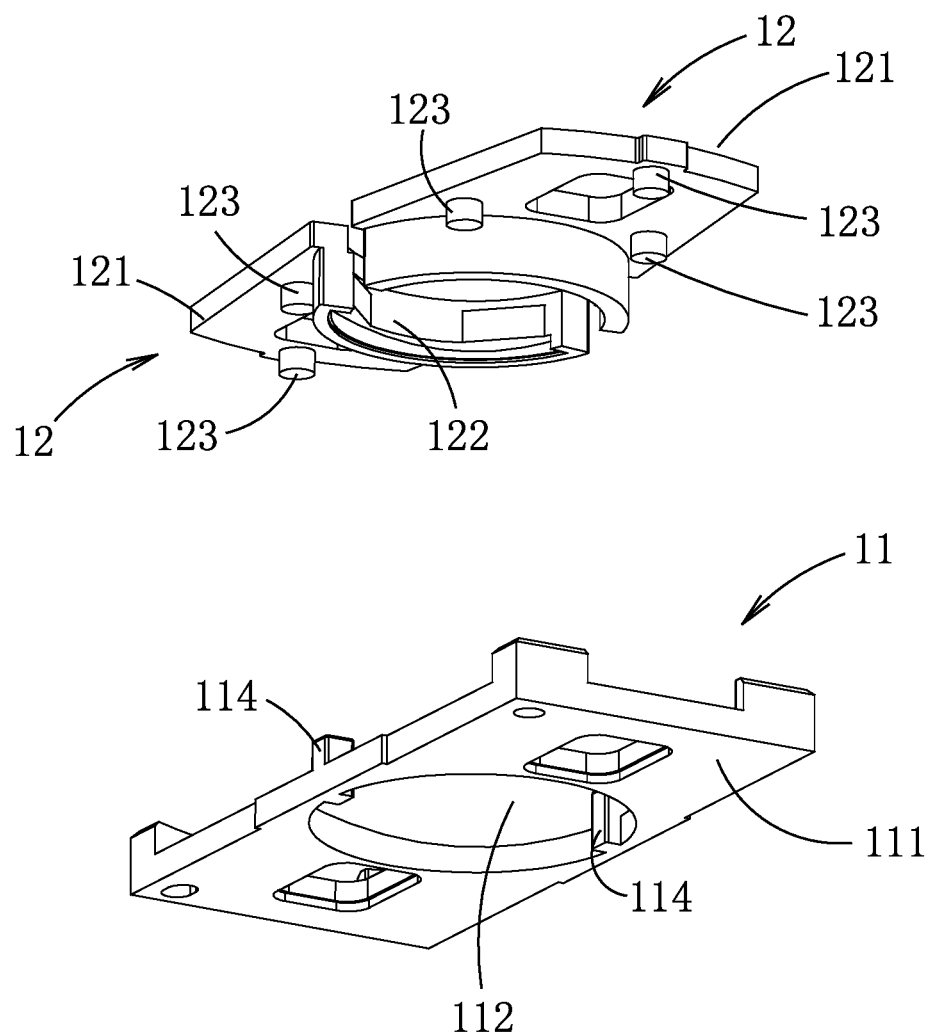
FIG. 9 is an exploded view of the prism carrying mechanism of FIG. 8 from another perspective.

FIG. 8 is an exploded view of a prism carrying mechanism of the third embodiment of the present disclosure. FIG. 9 is an exploded view of the prism carrying mechanism of FIG. 8 from another perspective. Since the structural configuration of this embodiment is partially identical to that of the first embodiment, the same components would be given the same reference signs and relevant descriptions would be omitted. As shown in the figures, in this embodiment, a first sliding assembling part 113 is an arc-shaped guiding groove, whose two opposite sidewalls are perpendicular to its bottom wall, that is, a cross sectional area of the arc-shaped guiding groove is U-shaped. In some embodiments, the bottom wall of the arc-shaped guiding groove of the first sliding assembling part 113 is flat. In some embodiments, the bottom wall of the arc-shaped guiding groove of the first sliding assembling part 113 is a curved surface. In this embodiment, a second sliding assembling part 123 is a semi-cylindrical bump which is axially parallel to a surface of a carrying member body 121, and two axial end surfaces of the bump slidably abut against the two opposite sidewalls of the arc-shaped guiding groove of the first sliding assembling part 113, respectively.

Figure 10:
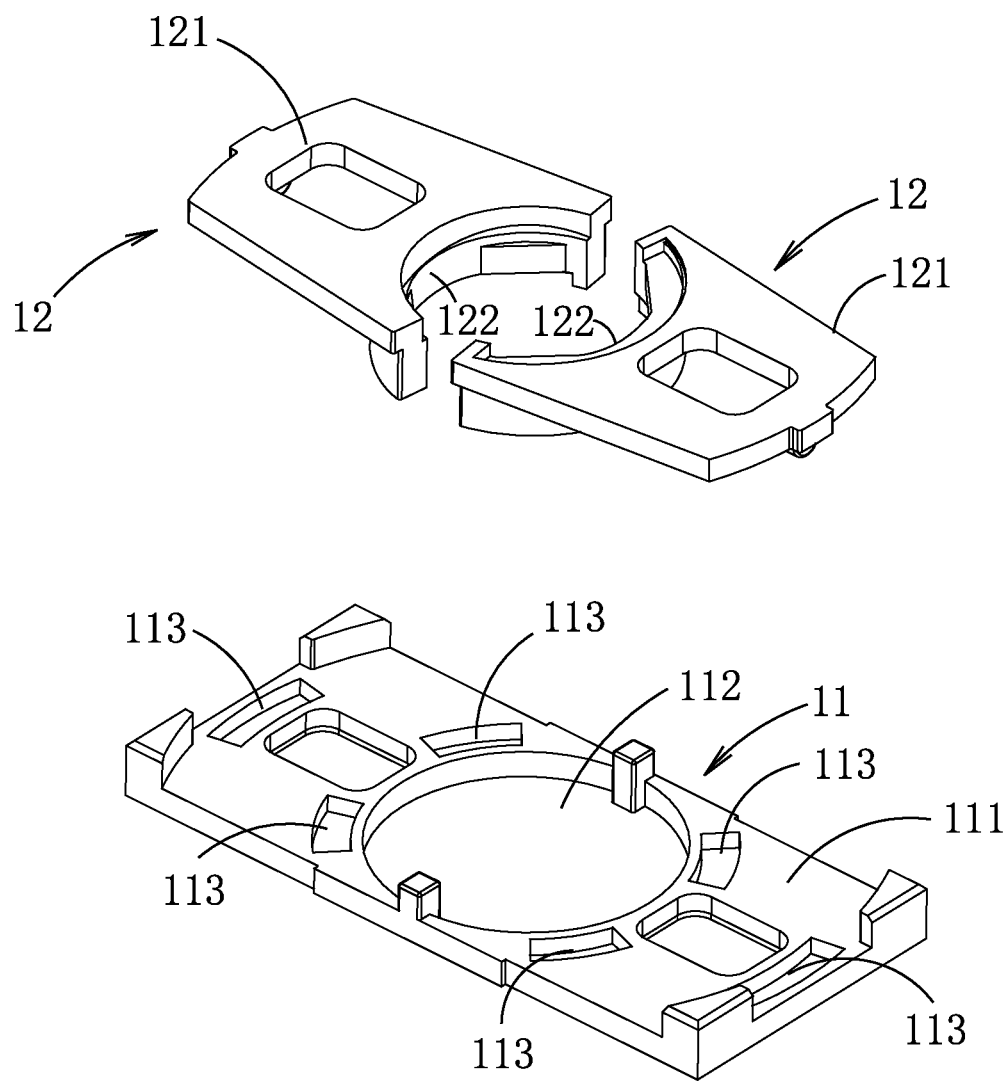
FIG. 10 is an exploded view of a prism carrying mechanism of the fourth embodiment of the present disclosure.
Figure 11:
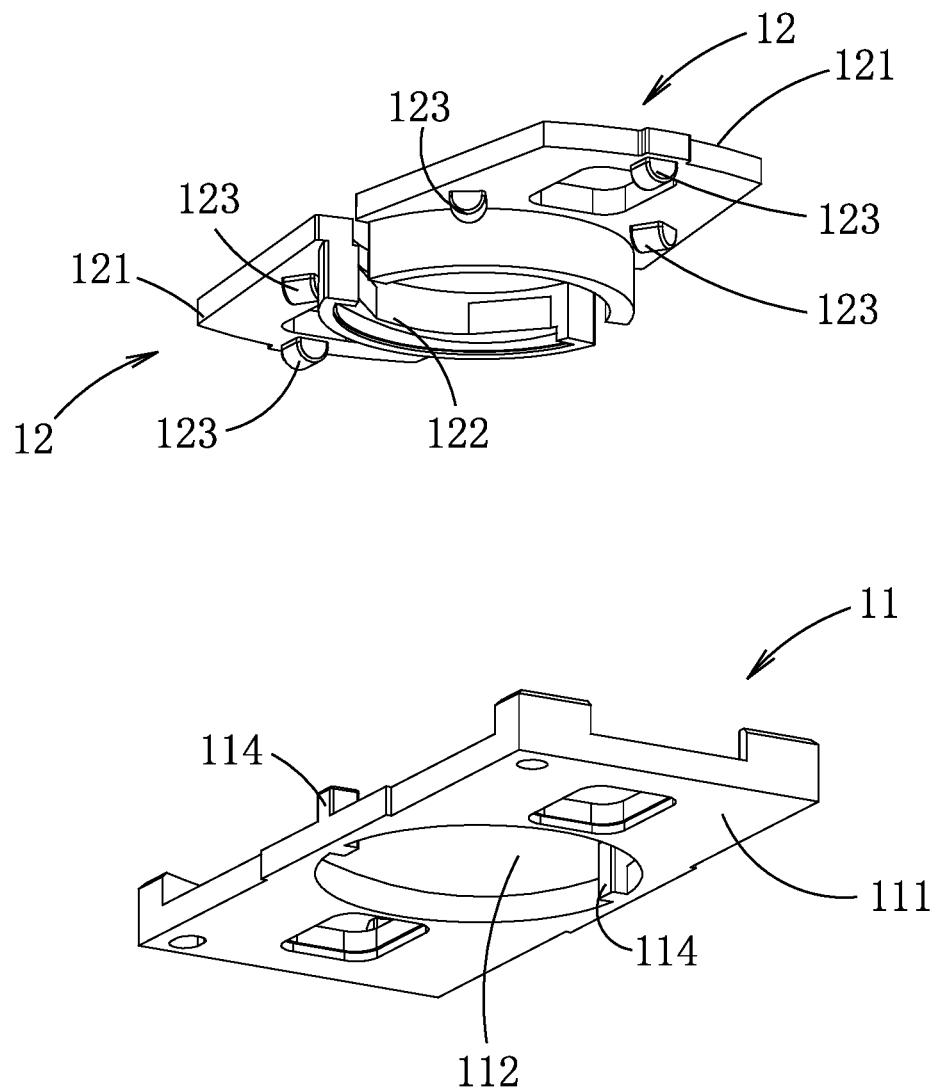
FIG. 11 is an exploded view of the prism carrying mechanism of FIG. 10 from another perspective.

FIG. 10 is an exploded view of a prism carrying mechanism of the fourth embodiment of the present disclosure. FIG. 11 is an exploded view of the prism carrying mechanism of FIG. 10 from another perspective. Since the structural configuration of this embodiment is partially identical to that of the third embodiment, the same components would be given the same reference signs and relevant descriptions would be omitted. As shown in the figures, in this embodiment, a first sliding assembling part 113 is an arc-shaped guiding groove, whose two opposite sidewalls are perpendicular to its bottom wall, that is, a cross sectional area of the arc-shaped guiding groove is U-shaped. In this embodiment, a second sliding assembling part 123 is a semi-cylindrical bump which is axially parallel to a surface of a carrying member body 121, and an outer circumferential surface of the bump slidably abut against the two opposite sidewalls of the arc-shaped guiding groove of the first sliding assembling part 113, respectively.

Figure 12:
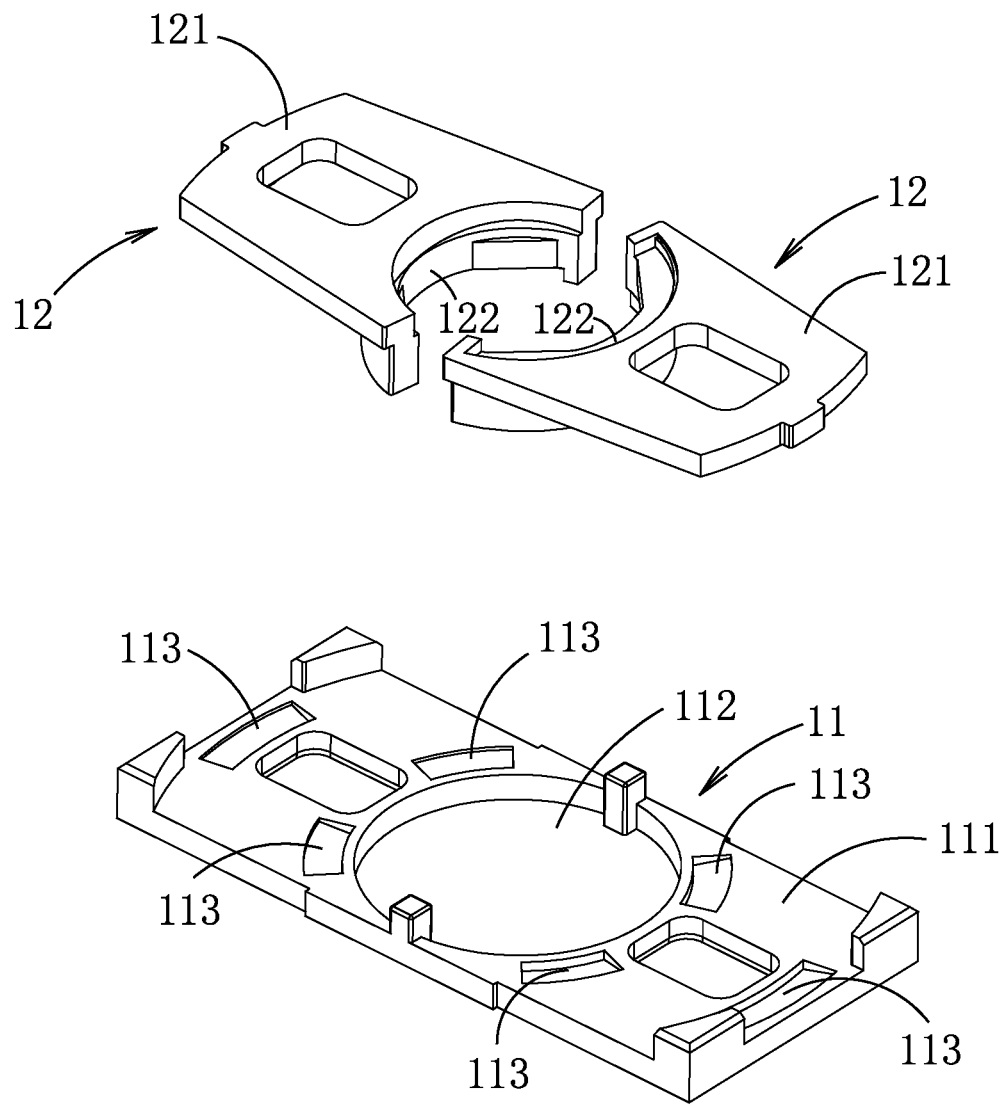
FIG. 12 is an exploded view of a prism carrying mechanism of the fifth embodiment of the present disclosure.
Figure 13:
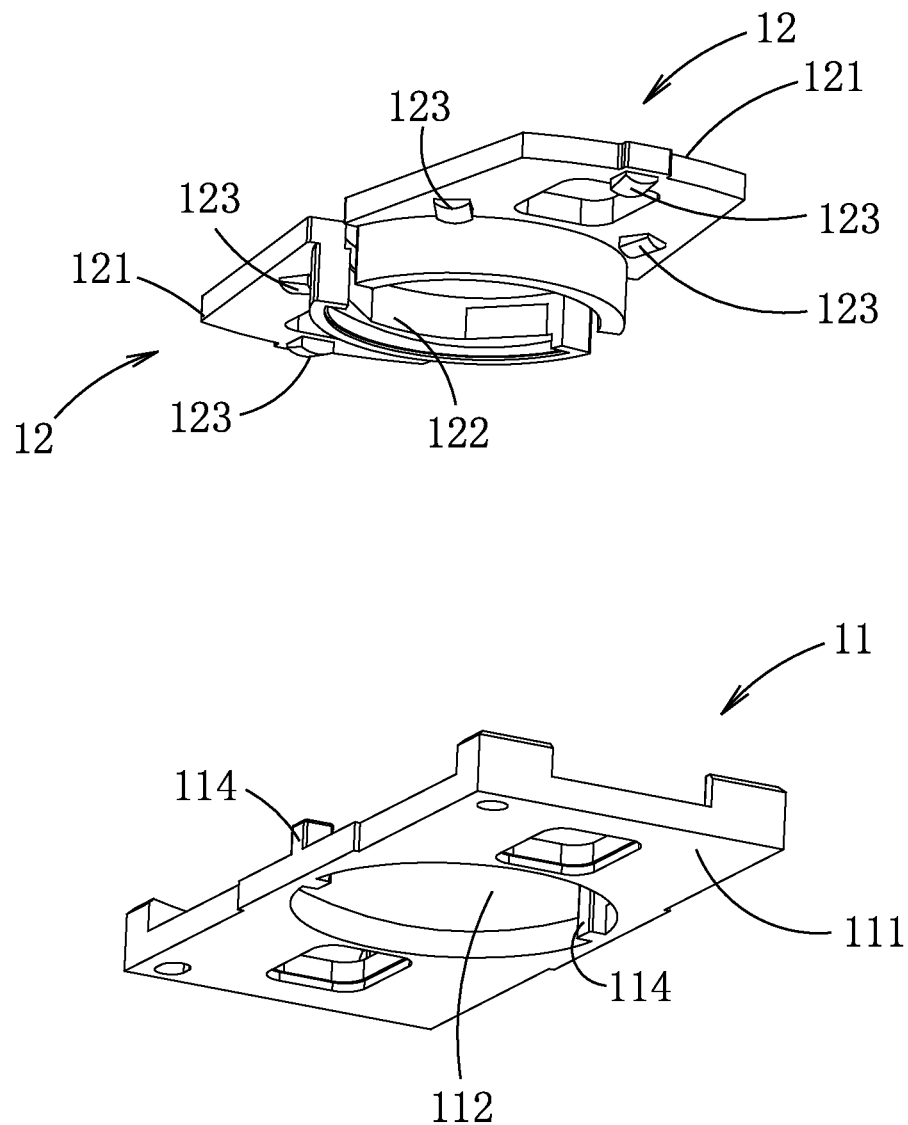
FIG. 13 is an exploded view of the prism carrying mechanism of FIG. 12 from another perspective.

FIG. 12 is an exploded view of a prism carrying mechanism of the fifth embodiment of the present disclosure. FIG. 13 is an exploded view of the prism carrying mechanism of FIG. 12 from another perspective. Since the structural configuration of this embodiment is partially identical to that of the first embodiment, the same components would be given the same reference signs and relevant descriptions would be omitted. As shown in the figures, in this embodiment, a first sliding assembling part 113 is an arc-shaped guiding groove, whose cross sectional area is wedge-shaped, that is, one sidewall of the arc-shaped guiding groove has a greater height, while the opposite sidewall has a smaller height. In this embodiment, a second sliding assembling part 123 is a semi-cylindrical bump which axially intersects with a surface of a carrying member body 121, that is, the heights of two end surfaces of the semi-cylindrical bump are different, and two axial end surfaces of the bump slidably abut against the opposite sidewalls of the arc-shaped guiding groove, respectively.

In the above embodiments, the second sliding assembling parts 123 of the prism carrying member 12 are bumps, but the present disclosure is not limited thereto. The first sliding assembling parts 113 of the base 11 could also be bumps, while the second sliding assembling parts 123 of the prism carrying member 12 could also be arc-shaped guiding grooves, forming a slidable assembly configuration.

Besides, in the above embodiments, the arc-shaped guiding grooves of the first sliding assembling parts 113 of the base 11 are blind guiding grooves, but the present disclosure is not limited thereto. The arc-shaped guiding grooves could also be through grooves of the base 11.

In the prism carrying mechanism of the present disclosure, by disposing the first sliding assembling parts at the base and the second sliding assembling parts at the prism carrying member, where the first sliding assembling parts are slidably assembled to the second sliding assembling parts, the prism carrying member can be driven by the driving module to move along the base. Since the first sliding assembling parts are disposed at the base and the second sliding assembling parts are disposed at the carrying member body of the prism carrying member, when the prism carrying member moves along the base, the first sliding assembling parts and the base would move synchronously, and the second sliding assembling parts and the prism carrying member would also move synchronously, so that there would be no slippage or blockage between the second sliding assembling parts and the first sliding assembling parts. Thus, the prism carrying member could accurately move to a predetermined position along the base according to control commands for accurate image compensation.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A prism carrying mechanism, comprising:
   a base comprising a base body, a light passing hole disposed at the base body, a plurality of first sliding assembling parts integrally formed on a same side of the base body, and a pair of stopping members disposed on the base body, wherein the pair of stopping members are disposed on opposite sides of the light passing hole; and
   a pair of prism carrying members, being on two sides of a connecting line of the pair of stopping members, each of the prism carrying members comprising a carrying member body, a prism assembling part disposed at the carrying member body and corresponding to the light passing hole, and a plurality of second sliding assembling parts integrally formed on a same side of the carrying member body, the prism assembling parts of the pair of prism carrying members being oppositely and alternately disposed related to an axial direction, the plurality of second sliding assembling parts being slidably assembled to the plurality of first sliding assembling parts respectively, allowing the pair of prism carrying members to respectively move around an axis passing through a center of the light passing hole, two end edges of the carrying member body adjacent to the prism assembling part respectively abut against the pair of stopping members.

2. The prism carrying mechanism according to claim 1, wherein each of the plurality of first sliding assembling parts is an arc-shaped guiding groove and each of the plurality of second sliding assembling parts is a bump; or, each of the plurality of first sliding assembling parts is a bump and each of the plurality of second sliding assembling parts is an arc-shaped guiding groove; wherein a center of a circle corresponding to each of the arc-shaped guiding grooves coincides with the center of the light passing hole.

3. The prism carrying mechanism according to claim 2, wherein an inclination angle greater than or equal to 90 degrees is formed between two opposite sidewalls and a bottom wall of at least one of the arc-shaped guiding grooves.

4. The prism carrying mechanism according to claim 3, wherein a cross sectional area of at least one of the arc-shaped guiding grooves is an inverted trapezoid area; at least one of the bumps slidably assembled to the at least one arc-shaped guiding groove having an inverted trapezoid cross sectional area is hemispherical or hemicapsule shaped.

5. The prism carrying mechanism according to claim 3, wherein the two opposite sidewalls of at least one of the arc-shaped guiding grooves are perpendicular to the bottom wall and a cross sectional area of the at least one arc-shaped guiding groove is U-shaped; at least one of the bumps slidably assembled to the at least one arc-shaped guiding groove having a U-shaped cross sectional area is cylindrical.

6. The prism carrying mechanism according to claim 3, wherein a cross sectional area of at least one of the arc-shaped guiding grooves is U-shaped; at least one of the bumps slidably assembled to the at least one arc shaped guiding groove having an U-shaped cross sectional area is semi-cylindrical shaped whose axial direction is parallel to a surface of the carrying member body; two axial end surfaces of the at least one bump slidably abut against the opposite sidewalls of the at least one arc-shaped guiding groove, respectively.

7. The prism carrying mechanism according to claim 2, wherein at least one of the bumps is semi-cylindrical shaped whose axial direction is perpendicular to a surface of the carrying member body; a cross sectional area of at least one of the arc-shaped guiding grooves slidably assembled to the at least one semi-cylindrical shaped bump is wedge-shaped; two axial end surfaces of the at least one bump slidably abut against opposite sidewalls of the at least one arc-shaped guiding groove, respectively.

8. The prism carrying mechanism according to claim 1, wherein the number of the plurality of first sliding assembling parts is at least three; a distance between at least one of the first sliding assembling parts and the center of the light passing hole is different from a distance between another one of the first sliding assembling parts and the center of the light passing hole.

9. An image compensation device, comprising:
   a base comprising a base body, a light passing hole disposed at the base body, and a plurality of first sliding assembling parts integrally formed on a same side of the base body;
   a pair of prism carrying members, each of the prism carrying members comprising a carrying member body, a prism assembling part disposed at the carrying member body and corresponding to the light passing hole, and a plurality of second sliding assembling parts integrally formed on a same side of the carrying member body, the prism assembling parts of the pair of prism carrying members being oppositely and alternately disposed related to an axial direction, the plurality of second sliding assembling parts being slidably assembled to the plurality of first sliding assembling parts respectively, allowing the pair of prism carrying members to respectively move around an axis passing through a center of the light passing hole;
   a pair of driving modules, each of the pair of driving modules comprising a driving member disposed at the base and a driven member disposed at the respective one of the prism carrying members, the driving member driving the driven member to move the prism carrying member around the axis; and a pair of wedge-shaped prisms respectively disposed at the prism assembling parts of the pair of prism carrying members, a thick end of one of the pair of wedge-shaped prisms corresponding to a thin end of the other of the pair of wedge-shaped prisms, and the pair of wedge-shaped prisms comprising a plurality of linear edges;

wherein the prism assembling part comprises linear assembling edges corresponding to the plurality of the linear edges.

10. The image compensation device according to claim 9, wherein each of the plurality of first sliding assembling parts is an arc-shaped guiding groove and each of the plurality of second sliding assembling parts is a bump; or, each of the plurality of first sliding assembling parts is a bump and each of the plurality of second sliding assembling parts is an arc-shaped guiding groove; wherein a center of a circle corresponding to each of the arc-shaped guiding grooves coincides with the center of the light passing hole.

11. The image compensation device according to claim 10, wherein an inclination angle greater than or equal to 90 degrees is formed between two opposite sidewalls and a bottom wall of at least one of the arc-shaped guiding grooves.

12. The image compensation device according to claim 11, wherein a cross sectional area of at least one of the arc-shaped guiding grooves is an inverted trapezoid area; at least one of the bumps slidably assembled to the at least one arc-shaped guiding groove having an inverted trapezoid cross sectional area is hemispherical or hemicapsule shaped.

13. The image compensation device according to claim 11, wherein the two opposite sidewalls of at least one of the arc-shaped guiding grooves are perpendicular to the bottom wall and a cross sectional area of the at least one arc-shaped guiding groove is U-shaped; at least one of the bumps slidably assembled to the at least one arc-shaped guiding groove having a U-shaped cross sectional area is cylindrical.

14. The image compensation device according to claim 11, wherein a cross sectional area of at least one of the arc-shaped guiding grooves is U-shaped; at least one of the bumps slidably assembled to the at least one arc shaped guiding groove having an U-shaped cross sectional area is semi-cylindrical shaped whose axial direction is parallel to a surface of the carrying member body; two axial end surfaces of the at least one bump slidably abut against the opposite sidewalls of the at least one arc-shaped guiding groove, respectively.

15. The image compensation device according to claim 9, wherein the base further comprises a pair of stopping members disposed on the base body; the pair of stopping members are disposed on opposite sides of the light passing hole; the pair of prism carrying members are on two sides of a connecting line of the pair of stopping members; two end edges of the carrying member body adjacent to the prism assembling part respectively abut against the pair of stopping members.

16. The image compensation device according to claim 9, wherein the number of the plurality of first sliding assembling parts is at least three; a distance between at least one of the first sliding assembling parts and the center of the light passing hole is different from a distance between another one of the first sliding assembling parts and the center of the light passing hole.

17. An image compensation device, comprising:

a base comprising a base body, a light passing hole disposed at the base body, and a plurality of first sliding assembling parts integrally formed on a same side of the base body;

a pair of prism carrying members, each of the prism carrying members comprising a carrying member body, a prism assembling part disposed at the carrying member body and corresponding to the light passing hole, and a plurality of second sliding assembling parts integrally formed on a same side of the carrying member body, the prism assembling parts of the pair of prism carrying members being oppositely and alternately disposed related to an axial direction, the plurality of second sliding assembling parts being slidably assembled to the plurality of first sliding assembling parts respectively, allowing the pair of prism carrying members to respectively move around an axis passing through a center of the light passing hole;

a pair of driving modules, each of the pair of driving modules comprising a driving member disposed at the base and a driven member disposed at the respective one of the prism carrying members, the driving member driving the driven member to move the prism carrying member around the axis; and a pair of wedge-shaped prisms respectively disposed at the prism assembling parts of the pair of prism carrying members, a thick end of one of the pair of wedge-shaped prisms corresponding to a thin end of the other of the pair of wedge-shaped prisms;

wherein the driving member comprises a coil and a magnetic conductive sheet; the driven member comprises a permanent magnet; the coil is disposed between the magnetic conductive sheet and the permanent magnet.

18. The image compensation device according to claim 17, wherein the magnetic conductive sheet and the permanent magnet are mutually magnetically attracted so that a relative distance between the base and each of the prism carrying members along the axis remains unchanged.

* * * * *